(12) United States Patent
Zukowski et al.

(10) Patent No.: US 8,244,647 B2
(45) Date of Patent: Aug. 14, 2012

(54) METHODS AND SYSTEMS FOR CONFIGURING MAILING EQUIPMENT

(75) Inventors: Deborra J. Zukowski, Newtown, CT (US); Michael P. Swenson, Danbury, CT (US); Jean-Hiram Coffy, Norwalk, CT (US); David K. Asano, Easton, CT (US)

(73) Assignee: Pitney Bowes Inc., Stamford, CT (US)

( * ) Notice: Subject to any disclaimer, the term of this patent is extended or adjusted under 35 U.S.C. 154(b) by 137 days.

(21) Appl. No.: 12/638,327

(22) Filed: Dec. 15, 2009

(65) Prior Publication Data

US 2011/0144808 A1  Jun. 16, 2011

(51) Int. Cl.
*G06Q 30/00* (2012.01)
(52) U.S. Cl. ........................................ 705/337
(58) Field of Classification Search .................. 705/337
See application file for complete search history.

(56) References Cited

U.S. PATENT DOCUMENTS

| | | | |
|---|---|---|---|
| 2004/0054786 A1* | 3/2004 | Kjellberg et al. | 709/228 |
| 2004/0094615 A1* | 5/2004 | Sansone et al. | 235/375 |
| 2005/0172002 A1* | 8/2005 | Maurin | 709/206 |
| 2008/0300938 A1* | 12/2008 | Pintsov et al. | 705/7 |

OTHER PUBLICATIONS

Lewis, Dave, "Intelligent Mail," High Volume Printing, Nov. 2006, pp. 40-41.*
The European Search Report for European Patent Application No. 10193274.4, May 25, 2011.

* cited by examiner

*Primary Examiner* — Nathan Erb
(74) *Attorney, Agent, or Firm* — George M. Macdonald; Charles R. Malandra, Jr.; Steven J. Shapiro

(57) ABSTRACT

A computer receives two input documents, including a carrier product description file and a document that describes attributes of a type of mailing equipment. The computer extracts information from the documents and generates a provisioning document based at least in part on the extracted information. The provisioning document is suitable for controlling a piece of mailing equipment which belongs to the particular type of mailing equipment, in such a manner that the piece of mailing equipment generates mail pieces in compliance with the carrier product description file. The provisioning document includes a script for controlling operation of the piece of mailing equipment and data to be read by the piece of mailing equipment.

5 Claims, 9 Drawing Sheets

METHODS AND SYSTEMS FOR CONFIGURING MAILING EQUIPMENT

FIELD OF THE INVENTION

The invention disclosed herein relates generally to mailing equipment, and more particularly to configuring mailing equipment by using machine-readable files.

BACKGROUND

FIG. 1 is a schematic representation of entities that are related in some way to mailing activities. Mailers, represented by block 102 in FIG. 1, generate mail pieces (not shown) either on a piece-by-piece basis or in batches. The mailers 102 deliver their mail pieces to mail carrying agencies (represented by block 104)—which may for example be a postal authorities, parcel carriers, overnight express companies, etc.—and the mail carrying agencies in turn transport and deliver the mail pieces to their intended recipients (represented by block 106). The mail carrying agencies carry the mail pieces pursuant to product offerings (e.g., classes of service) which the mail carrying agencies promulgate and which may be subject to approval and/or regulation by regulatory bodies (represented by block 108).

The mailers 102 typically use mailing equipment (block 110) which is manufactured and distributed by mailing equipment manufacturers (block 112). Third party service providers (block 114) may provide services related to dissemination of postal rate information, management of carrier product offering information, etc.

Typically, items of mailing equipment are microprocessor-based, such that operation of the mailing equipment is controlled by software and/or firmware that programs the embedded microprocessor. It is customary for computer programmers hired or retained by the equipment manufacturer to write the software/firmware to control the mailing equipment so that it produces mail pieces that are in compliance with a service offering of a mail carrying agency. In some cases, the mailing equipment is programmed to offer the user a choice of various classes of service. The mailing equipment responds to the user's selection of a particular class of service option by generating the mail piece(s) and any required accompanying document in accordance with the selected class of service under control of an application program previously written by the equipment manufacturer and previously installed in the mailing equipment to comply with the requirements of the selected class of service. It is often the case that the software in question is installed in the mailing equipment before the mailing equipment is shipped to the customer, or upon installation of the mailing equipment at the mailer's location.

The Universal Postal Union (UPU) is an international body that coordinates policies among member national postal authorities. The UPU has proposed EPPML (Extensible Postal Product Model and Language) as an XML-based standard for describing mail-based service offerings by postal authorities. One purpose of EPPML is to reduce the effective lead time required for adoption by mailers of new or revised services offered by postal authorities. However, even with EPPML, conventional practices by mailing equipment manufacturers are likely to entail a considerable lapse of time from introduction of a new service offering to actual use by mailers. This is because the equipment manufacturers may need to direct its programming staff or contractors to write new software or revise existing software for its mailing equipment. It is typically a matter of at least a few months for an equipment manufacturer to generate new software suitable for configuring an installed base of equipment (or newly manufactured equipment) to operate in compliance with a new postal service offering. Thus new service offerings by postal authorities are as a practical matter subject to significant delays in adoption owing to lead-times for equipment software updates.

SUMMARY

According to an aspect of the invention, a method includes a computer receiving a first input document which is a carrier product description file generated by a letter or parcel carrier. The computer also receives a second input document which describes attributes of a type of mailing equipment. Further, the computer extracts information from the first input document and from the second input document and generates a provisioning document based at least in part on the information extracted from the first input document and the second input document. The provisioning document includes data and instructions for preparing a piece of mailing equipment which belongs to the above-mentioned type of mailing equipment, such that the piece of mailing equipment becomes capable of generating mailpieces in compliance with the carrier product description file. Also, the provisioning document may include a script or binary code plugin for controlling the operation of the piece of mailing equipment at the time of mailpiece generation.

The first input document may be expressed in accordance with EPPML. The computer may generate the provisioning document based in part on a mailer's intended business practices and/or based in part on input received from a human operator. The provisioning document may define behavior for the piece of mailing equipment in connection with the piece of mailing equipment printing information on mail pieces and/or in connection with the piece of mailing equipment printing a document to accompany a group of mail pieces generated by the pieces of mailing equipment. The provisioning document may further define behavior of the piece of mailing equipment in connection with sending messages to the carrier, performing mail piece rating calculations, and/or providing accounting reports.

According to another aspect of the invention, an apparatus which includes a processor and a memory operates in accordance with program instructions stored in the memory to perform a process according to the aspects of the invention described in the two preceding paragraphs.

According to still another aspect of the invention, a method includes a first computer receiving a first input document which is a carrier product description file generated by a letter or parcel carrier. The first computer also receives a second input document which describes attributes of a class of mailing equipment. Further, the first computer extracts information from the first input document and from the second input document and generates a class provisioning document based at least in part on the information extracted from the first input document and the second input document. The method also includes a second computer receiving the first input document, the second input document, the class provisioning document and a third input document. The third input document describes attributes of a type of mailing equipment that is a subset of the class of mailing equipment. The second computer generates a type provisioning document based at least in part on the third input document and the class provisioning document. The method further includes a third computer receiving the first input document, the second input document, the type provisioning document and the third input document. The third computer also receives fourth input, the fourth input relating to requirements for operating by a single mailer one or more pieces of mailing equipment of the aforementioned type of mailing equipment. In certain illustrative embodiments, the third computer also receives a fifth input, wherein the fifth input describes attributes of an on-site customization of mailing equipment that is a subset of the type of mailing equipment. Still further, the third computer generates a mailer provisioning document based at least in part on the fourth and/or fifth input and the type provisioning document. The mailer provisioning document includes data and instructions for preparing at least one piece of mailing equipment which belongs to the above-mentioned type of mailing equipment, such that the at least one piece of mailing equipment becomes capable of generating mailpieces in compliance with the carrier product description file. Also, the mailer provisioning document may include a script or binary code plugin for controlling the operation of the at least one piece of mailing equipment at the time of mailpiece generation.

With machine-based generation of provisioning documents in accordance with the invention, the provisioning documents may be generated shortly after issuance of new carrier product offerings and then promptly downloaded to an installed base of mailing equipment, so that there may be significant acceleration of the process for mailer adoption of new or modified service offerings from mail carrying agencies. Provisioning documents may also be employed in connection with updating mailing equipment to comply with changes in carrier product offerings without requiring the resident software to be revised.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

Figure 1:
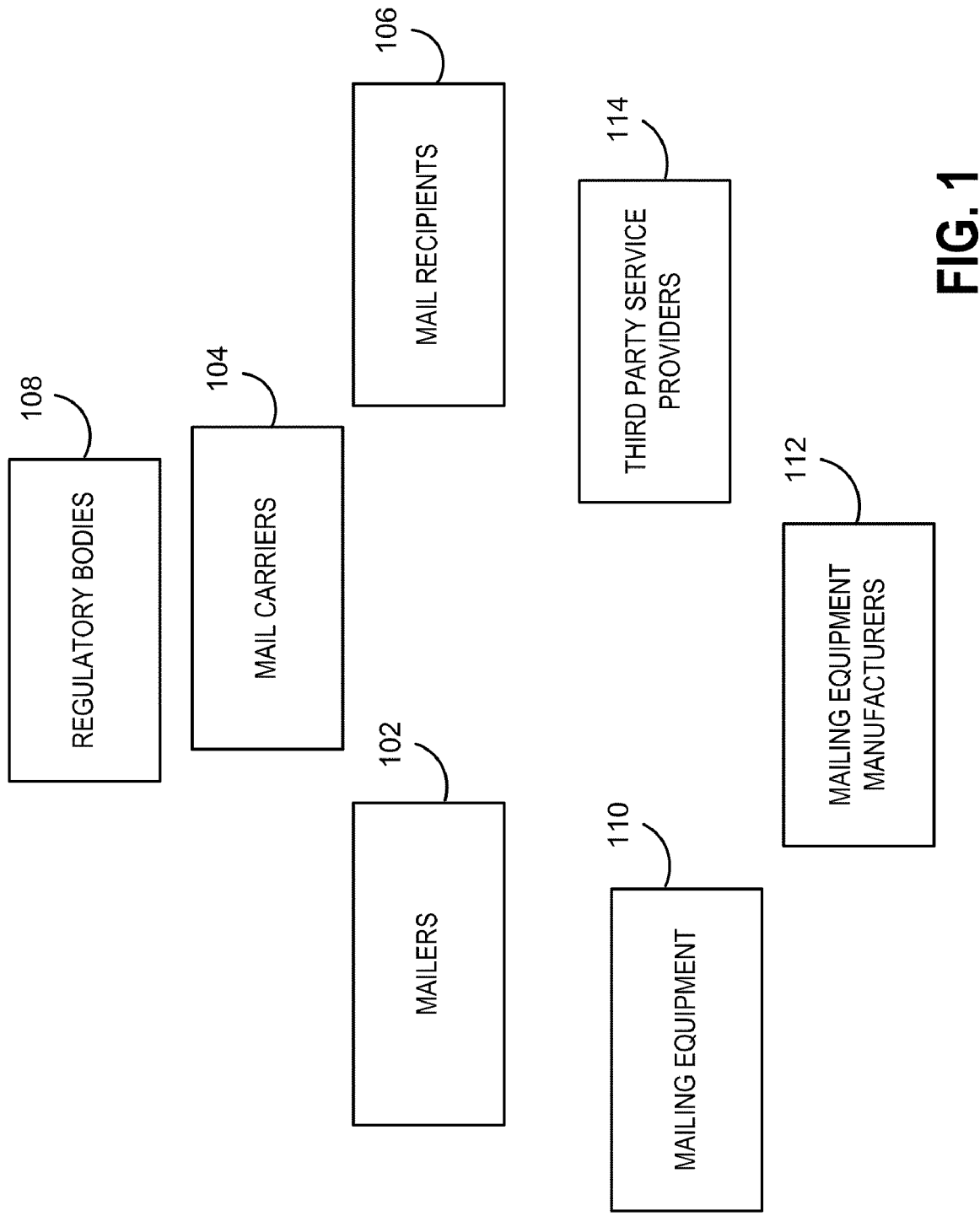
FIG. 1 is a schematic representation of entities that are related in some way to mailing activities.
Figure 2:
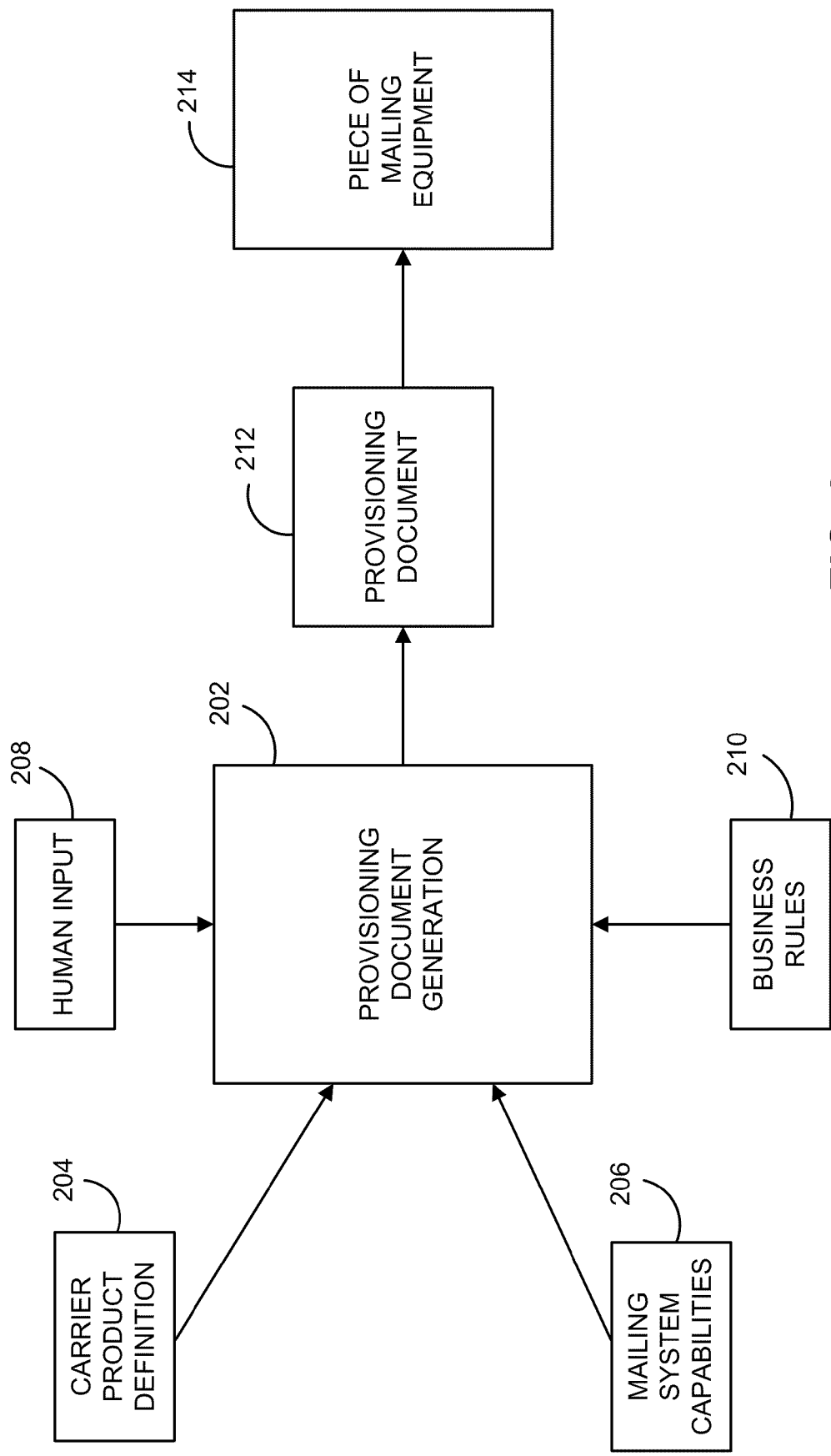
FIG. 2 schematically illustrates a process performed in accordance with an aspect of the present invention.

In accordance with aspects of the present invention, a computer parses input files including a document that describes a product offering (e.g., a class of service) from a mail carrying agency (e.g., a postal authority), and a document that describes attributes (e.g., operating capabilities) of a target piece of mailing equipment. Other inputs may include manual input from a human operator and a file which defines business rules established for the operation of the target piece of mailing equipment. Based on these inputs, the computer generates a provisioning document which includes one or more scripts and data that is readable by the target piece of mailing equipment. The provisioning document is input into the target piece of mailing equipment to configure the piece of mailing equipment to operate such as to produce one or more mail pieces in compliance with the carrier product offering FIG. 2 schematically illustrates a process performed in accordance with an aspect of the present invention. Block 202 represents a provisioning document generation function or device (as discussed below, this function/device may be implemented as a general purpose computer programmed with a provisioning document generation software tool). The major inputs to the provisioning document generation function/device 202 are a carrier product description file (CPDF) represented by block 204 and a mailing system capabilities (MSC) document which is represented by block 206. Both of these documents are input into and received by the provisioning document generation function/device 202. In at least some cases there may be additional inputs to the provisioning document generation function/device 202, such as input (block 208) manually entered by a human operator (e.g., by interaction with a graphical user interface (GUI)) and a document 210 which sets forth rules established for mailing operations by the entity that owns/operates the piece of mailing equipment for which the provisioning document is intended. The human input 208 and the business rules document 210 are also received by the provisioning document generation function/device 202.

The CPDF 204 may have been issued in EPPML by a mail carrying agency as a description of a new service offering from the mail carrying agency. (However, the CPDF need not necessarily be in EPPML.) The function of the CPDF 204 is to provide a description in a structured format of the service offering. The CPDF may begin with a document header, and may next indicate a period of time for which the service offering will be in effect. Identifying information for the product/service offering may follow, and then a webpage address for a webpage which sets forth the terms and agreements that are applicable to the product/service offering.

In the next section of the CPDF, operational requirements for the product/service offering may be set forth. These requirements may indicate what types/sizes of mail pieces qualify for the service offering. These requirements may, for example specify physical/dimensional constraints that apply. Weight limitations may also be set forth.

The CPDF may further set forth operation requirements concerning information that is required to be printed on the subject mail pieces. Example information requirements may for example include a mailing permit number and the date on which the mailing is being produced. In addition, an image such as an indicia may also be required, and dimensions for the image may be defined. Further, the CPDF may specify a particular type of ink for printing the required information, and may also define the required locations on the mail piece for the printed information. The CPDF may also prescribe electronic delivery of information about a mail piece or job from the mailer to the carrier.

The CPDF may also specify other mail piece attributes, including the recipient address, with requirements for location of the address information, as well as requirements for printing font and line spacing.

After the operational requirements, the CPDF may set forth offering constraints for the service offering may be set forth, including applicable actions and rules. The actions and rules may, for example, set forth steps that the mailer must perform to qualify for participation in the service offering, and actions that will be performed by the mail carrying agency as a result of aspects of the service offering. A further portion of the CPDF may relate to rating (establishment of postal charges) for the service offering. The rating section of the CPDF may provide a webpage address for accessing a webpage that contains the relevant rating schedule. Another section in the CPDF may relate to requirements for mailers to provide evidence that postage has been paid for a mailing. The CPDF may further include a reference to a lexicon of applicable terms and with a human-readable comment section (which is blank in this example document).

The MSC document 206 may also be in a structured format, suitable for parsing by the provisioning document generation function/device 202. The MSC document 206 may describe the capabilities and attributes of a particular type of mailing equipment in such a manner that the provisioning document generation function/device 202 is able to map the product offering requirements set forth in the CPDF 204 into what the mailing equipment is able to do. After beginning with a suitable header (which may for example identify the type of mailing equipment described in the MSC document 206), the document may next provide a description of hardware aspects of the mailing equipment, including, e.g., an identification of the main computer processor component (CPU) and its operating rate, along with the amount of memory space available. Next in the MSC document 206 there may be a description of the resident software, including identification of the operating system, the runtime portion of the software system, and installed application programs.

The MSC may also contain descriptive information relative to any postal revenue security component in the target piece of mailing equipment.

In addition to the description of the IT-related aspects of the mailing equipment, the MSC document 206 may also describe physically active components of the mailing equipment, including for example operating capabilities of a paper stock (e.g., envelope) feeder component. For example, the portion which describes the feeder may specify maximum and/or minimum length, height and width constraints for the envelopes that the feeder is able to handle. Other operating constraints, such as the maximum throughput (items per minute) may also be indicated in this section of the MSC document 206.

A subsequent section of the MSC document 206 may describe an output component of the mailing equipment, such as a secure printer that operates to apply franking indicia on mail pieces. Again operational constraints for the output device may be set forth, including dimension ranges of envelopes that the output device is able to handle, throughput rates, etc. This section may also contain information about firmware and/or software that drives the printing aspects of the output device.

Still a further section of the MSC document 206 may set forth data communication capabilities of the mailing equipment.

In some cases, only the CPDF 204 and the MSC document 206 will be needed as inputs to the provisioning document generation function/device 202. However, in other cases, the information available via these two documents may be and/or may need to be supplemented with input entered by a human operator and/or with input indicative of policy choices/rules established by the mailer which operates the target piece of mailing equipment. These possibilities are reflected by blocks 208 and 210 in FIG. 2.

Based on the inputs described above, the provisioning document generation function/device 202 generates as an output a provisioning document indicated at 212 in FIG. 2. The provisioning document 212 may then be supplied to and read by the target piece of mailing equipment (block 214) to configure the target piece of mailing equipment to produce mail pieces/mailings in accordance with the service offering described by the CPDF 204. (As discussed below, the piece of mailing equipment 214 may be microprocessor-based and may be programmed with a provisioning document application software tool for reading and interpreting the provisioning document and controlling the mailing equipment in accordance with the provisioning document.) Details of a process for generating the provisioning document 212 will be described below in connection with FIGS. 4-6. The Appendix hereto is a simplified example of the provisioning document 212.

Referring to section 1 of the Appendix, the provisioning document 212 may begin with a header, which may include, for example, the name of a carrier service offering and/or a mail generation application to be implemented with the provisioning document 212. Thereafter, the provisioning document 212 may incorporate and/or reference Terms and Agreements applicable to the service offering, as included and/or referenced in the CPDF 204.

The next portion of the provisioning document 212 may indicate the "input set" for the provisioning document 212—i.e., may specify the particular CPDF and the particular MSC document used to generate the provisioning document 212. The provisioning document 212 may also identify by model number the target piece of mailing equipment.

The provisioning document 212 may next set forth requirements for compliance with the service offering, including e.g. prerequisites or post-processing requirements for the service offering. The requirements portion may also contain references to software that is to be accessed and imported to implement features of the provisioning document 212. Still further, the requirements portion may include instructions to the mailing equipment operator to attach any needed hardware accessory (e.g., a certain type of print head), to load any necessary supply (e.g., a certain type of ink), and to provide envelopes, printing stock or the like as necessary for the desired mailing generation operation.

Thereafter, the provisioning document 212 may contain a series of scripts. As used herein and the appended claims, the term "script" refers to machine-readable code that is interpreted at runtime to control the mailing equipment processor to result in desired behavior by the mailing equipment. The series of scripts may, for example, include a script for a set up operation of the piece of mailing equipment with respect to the feeder component of the piece of mailing equipment. Another script may be for causing the piece of mailing equipment to perform a job set up function (including, e.g., any necessary prompts/interactions with respect to a human operator of the piece of mailing equipment). Still another script may be for causing the piece of mailing equipment to execute the mailing job. The term "script" also includes a binary code plugin that is executable at runtime without requiring interpretation or compiling.

In some embodiments, the set up script may cause establishment of persistent data states in a "dataspace" that is also accessible during the execution of the mailing job. In some embodiments, one or more of the scripts may include rating components that handle calculation or other determination of charges applicable to the mail pieces and payment and/or evidencing of payment of the charges. The rating components may access external rating resources including resources available via the carrier's website.

In some embodiments, at least some of the scripts may contain image generation and image location components for producing images to be printed on the mail pieces during execution of the mailing job.

Figure 3:
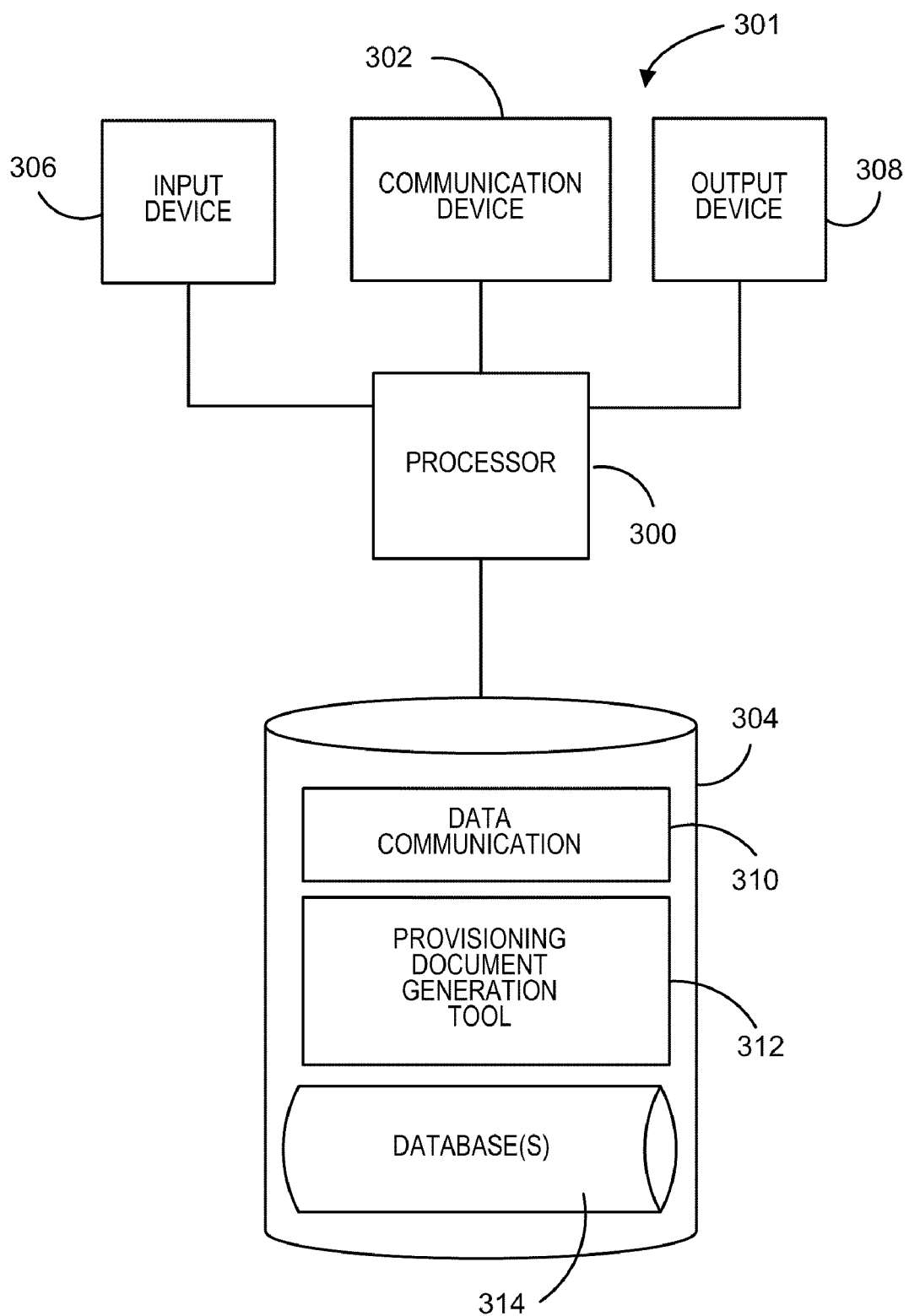
FIG. 3 is a block diagram representation of a computer that plays a part in the process of FIG. 2.

FIG. 3 is a block diagram representation of a computer 301 that may implement/embody the provisioning document generation function/device 202 shown in FIG. 2. The computer 301 will hereinafter be referred to as the "provisioning document generation computer 301" although it may perform other functions as well.

As depicted, the provisioning document generation computer 301 includes a computer processor 300 operatively coupled to a communication device 302, a storage device 304, one or more input devices 306 and one or more output devices 308.

Communication device 302 may be used to facilitate communication with, for example, other devices (such as target pieces of mailing equipment and/or other computers—which are not shown—and which may provide one or more of the inputs indicated in FIG. 2). The input device(s) 306 may comprise, for example, a keyboard, a keypad, a mouse or other pointing device, a microphone, knob or a switch, an infra-red (IR) port, a docking station, and/or a touch screen. The input device(s) 306 may be used, for example, to enter information. Output device(s) 308 may comprise, for example, a display (e.g., a display screen), a speaker, and/or a printer.

Continuing to refer to FIG. 3, storage device 304 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices. At least some of these devices may be considered computer-readable storage media, or may include such media.

In some embodiments, the hardware aspects of the provisioning document generation computer 301 may be entirely conventional.

Storage device 304 stores one or more programs or portions of programs (at least some of which being indicated by blocks 310, 312) for controlling processor 300. Processor 300 performs instructions of the programs, and thereby operates in accordance with the present invention. In some embodiments, the programs may include a program or program module 310 that programs the provisioning document generation computer 301 to engage in data communications with other devices.

Continuing to refer to FIG. 3, the storage device 304 may also store a provisioning document generation software tool 312. Functionality embodied in the provisioning document generation software tool 312 will be described below in connection with FIGS. 4-6.

There may also be stored in the storage device 304 other software, such as one or more conventional operating systems, device drivers, other application programs for performing other functions, etc.

Still further, the storage device 304 may store various databases (block 314) that the provisioning document generation computer 301 employs in connection with its operations.

Figure 4:
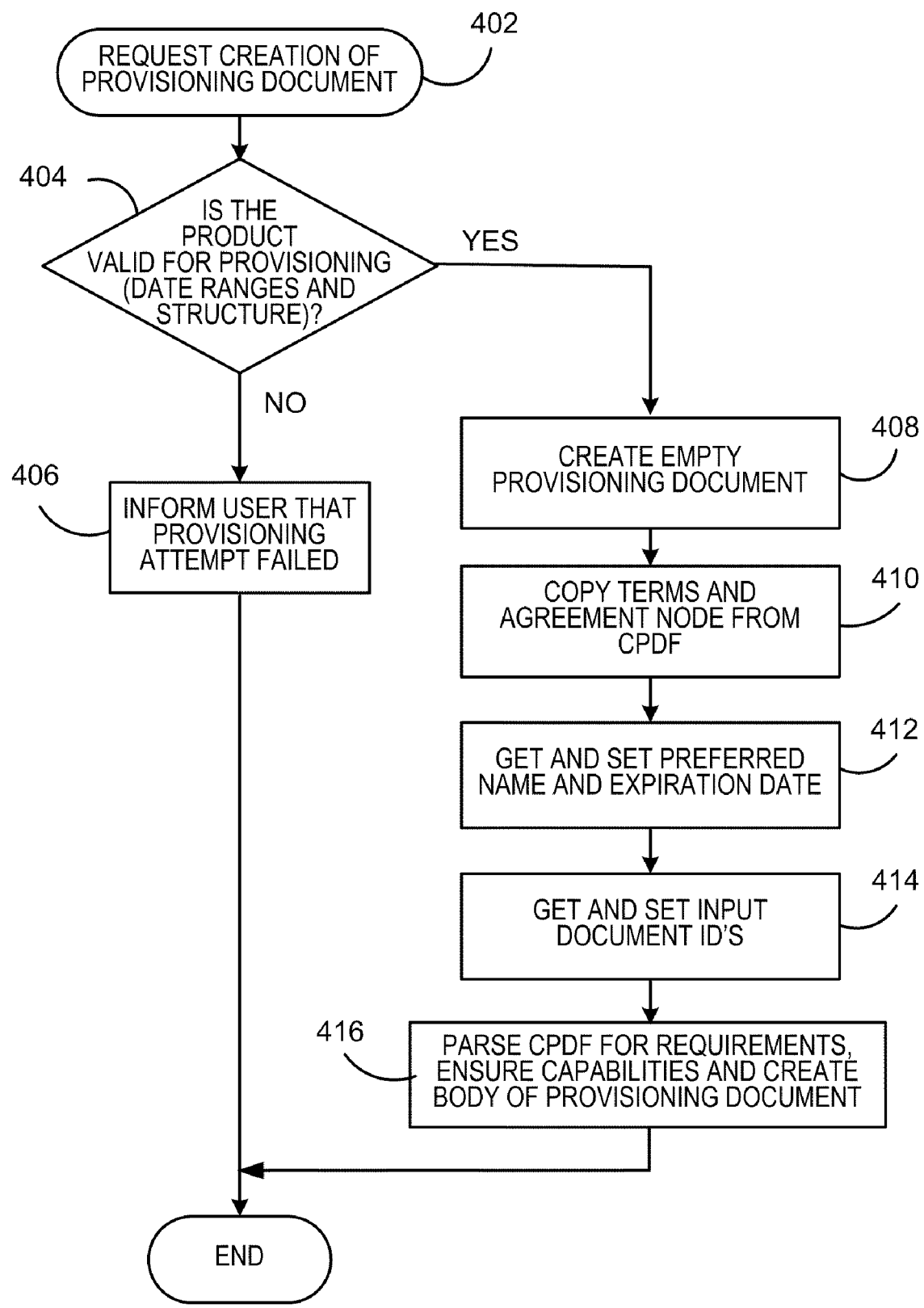
FIG. 4 is a flow chart that illustrates a process performed by the computer of FIG. 3 in accordance with aspects of the present invention.

FIG. 4 is a flow chart that illustrates a process performed by the provisioning document generation computer 301 in accordance with aspects of the present invention. Commencement of the provisioning document generation process is indicated at block 402 in FIG. 4. It is assumed in connection with block 402 that the provisioning document generation computer 301 receives at least the CPDF and MSC input documents described above. The CPDF document describes the carrier service offering for which the provisioning document is to be generated. The MSC document describes capabilities of the target piece of mailing equipment for which the provisioning document is to be generated.

Following block 402 in FIG. 4 is a decision block 404. At decision block 404 the provisioning document generation computer 301 determines whether the CPDF is complete in its description of the carrier service offering and whether the carrier service offering is by its terms currently available for adoption by mailers. If either is not the case, then the process of FIG. 4 advances from decision block 404 to block 406. At block 406, the provisioning document generation process is terminated and the user is informed that the provisioning document will not be generated. (Alternatively, however, in some embodiments, the provisioning document generation computer 301 may operate to generate partial provisioning documents with respect to incomplete CPDFs and/or may generate provisioning documents for service offerings that are not yet available for adoption.)

If the CPDF is complete and the service offering is currently available for adoption, then the process of FIG. 4 advances from decision block 404 to block 408. At block 408, the provisioning document generation computer 301 creates an empty version or shell of the provisioning document. Then, at 410, the provisioning document generation computer 301 imports the "terms and agreements" portion of the CPDF into the provisioning document. Next, at 412, the provisioning document generation computer 301 fills in the product name and expiration date portions of the provisioning document. For example, this may be done by importing the corresponding portions of the CPDF. Alternatively, however, the provisioning document generation computer 301 may query a user of the provisioning document generation computer 301 as to whether the user wishes to modify the product name and/or expiration date. If so, the provisioning document generation computer 301 may receive user input regarding such modification and may modify the provisioning document accordingly.

Block 414 follows block 412. At block 414, the provisioning document generation computer 301 takes from the CPDF and MSC documents the information therein which identifies those documents and writes that information into the portion of the provisioning document which identifies its source documents.

Following block 414 is block 416. Block 416 is illustrated in more detail in FIG. 5, and is generally concerned with creating the body of the provisioning document, including parsing the CPDF document to determine the requirements for the carrier product, and parsing the MSC document to determine the capabilities of the target mailing equipment.

Figure 5:
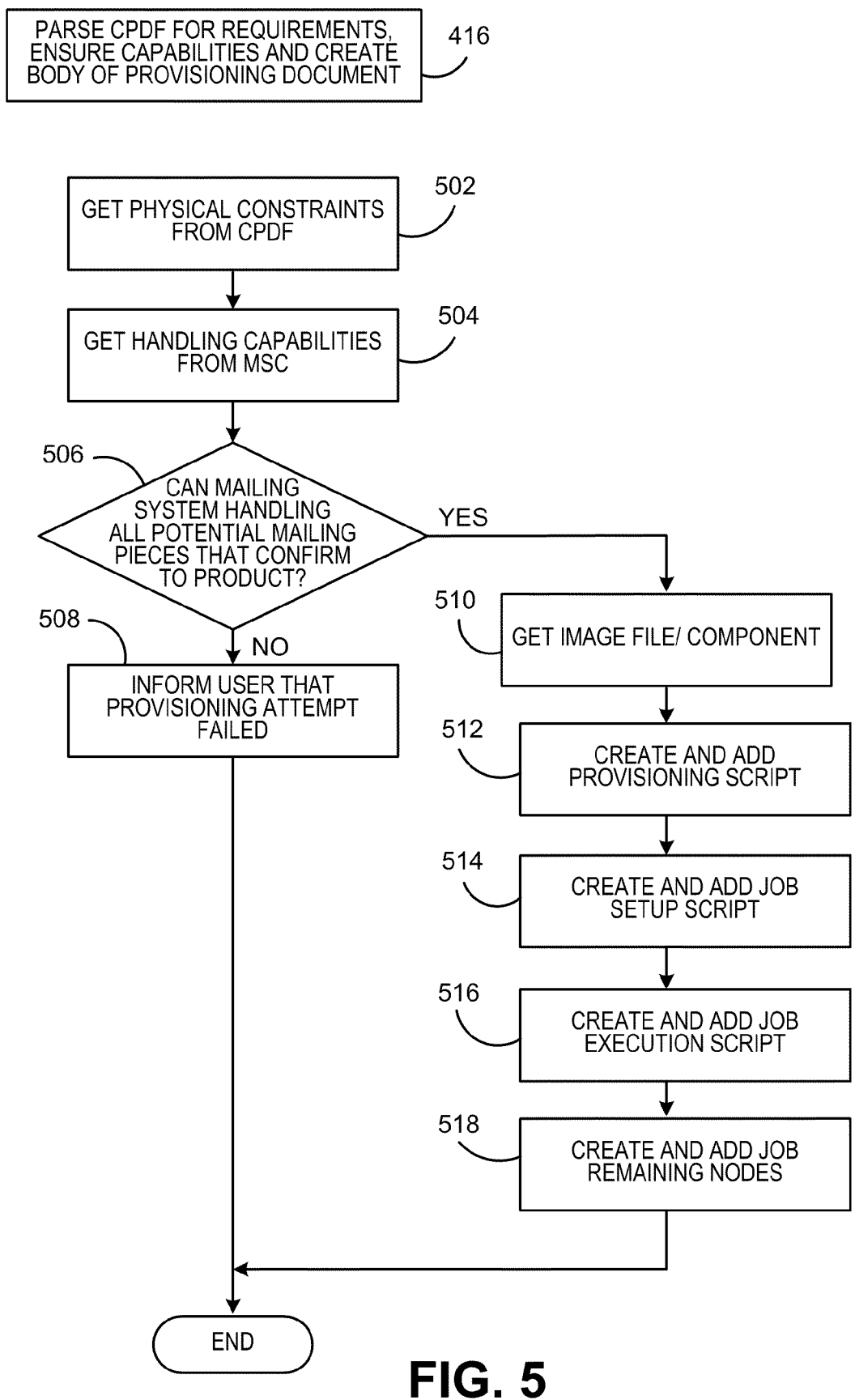
FIG. 5 is a flow chart that illustrates some details of the process of FIG. 4.

Turning then to FIG. 5, and its more detailed representation of block 416, at 502 the provisioning document generation computer 301 extracts from the CPDF the physical constraints/requirements for generating mail pieces in compliance with the carrier service offering. Concomitantly, at 504, the provisioning document generation computer 301 extracts from the MSC document the relevant capabilities of the target mailing equipment relative to handling mail pieces. In connection with decision block 506, the provisioning document generation computer 301 compares the equipment capabilities with the service offering requirements to determine whether the target mailing equipment has the capabilities needed to produce mail pieces in compliance with the service offering. If such is not the case, then block 508 follows decision block 506. At block 508, the provisioning document generation computer 301 terminates preparation of the provisioning document and informs the user that the provisioning document will not be completed. (However, in accordance with some embodiments, if the target piece of mailing equipment is able to comply with a viable subset of a carrier's product offering, then generation of the provisioning document may proceed to allow the target piece of mailing equipment to operate in accordance with a restricted version of the product offering.)

If the provisioning document generation computer 301 determines at decision block 506 that the target mailing equipment has the necessary capabilities for the service offering, then block 510 follows decision block 506. At block 510, the provisioning document generation computer 301 builds an image and/or image generation component, as illustrated in more detail in FIG. 6.

Figure 6:
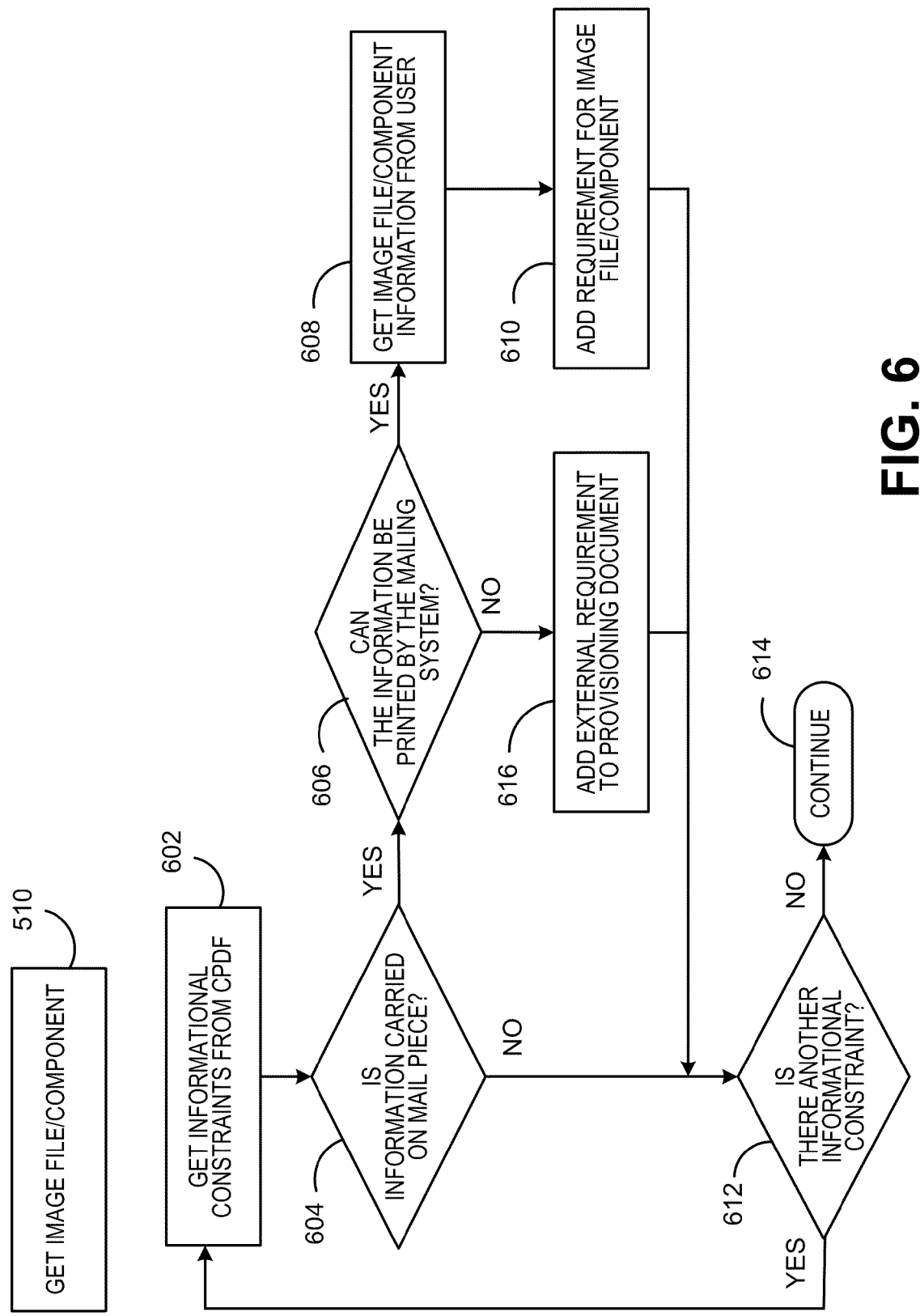
FIG. 6 is a flow chart that illustrates further details of the process of FIG. 4.

Turning then to FIG. 6, and its more detailed representation of block 510, at 602, the provisioning document generation computer 301 extracts from the CPDF the informational requirements for the service offering. For each informational requirement, the provisioning document generation computer 301 determines at decision block 604 whether the requirement in question calls for printing of information on the mail piece. If so, then decision block 606 follows decision block 604.

Figure 7:
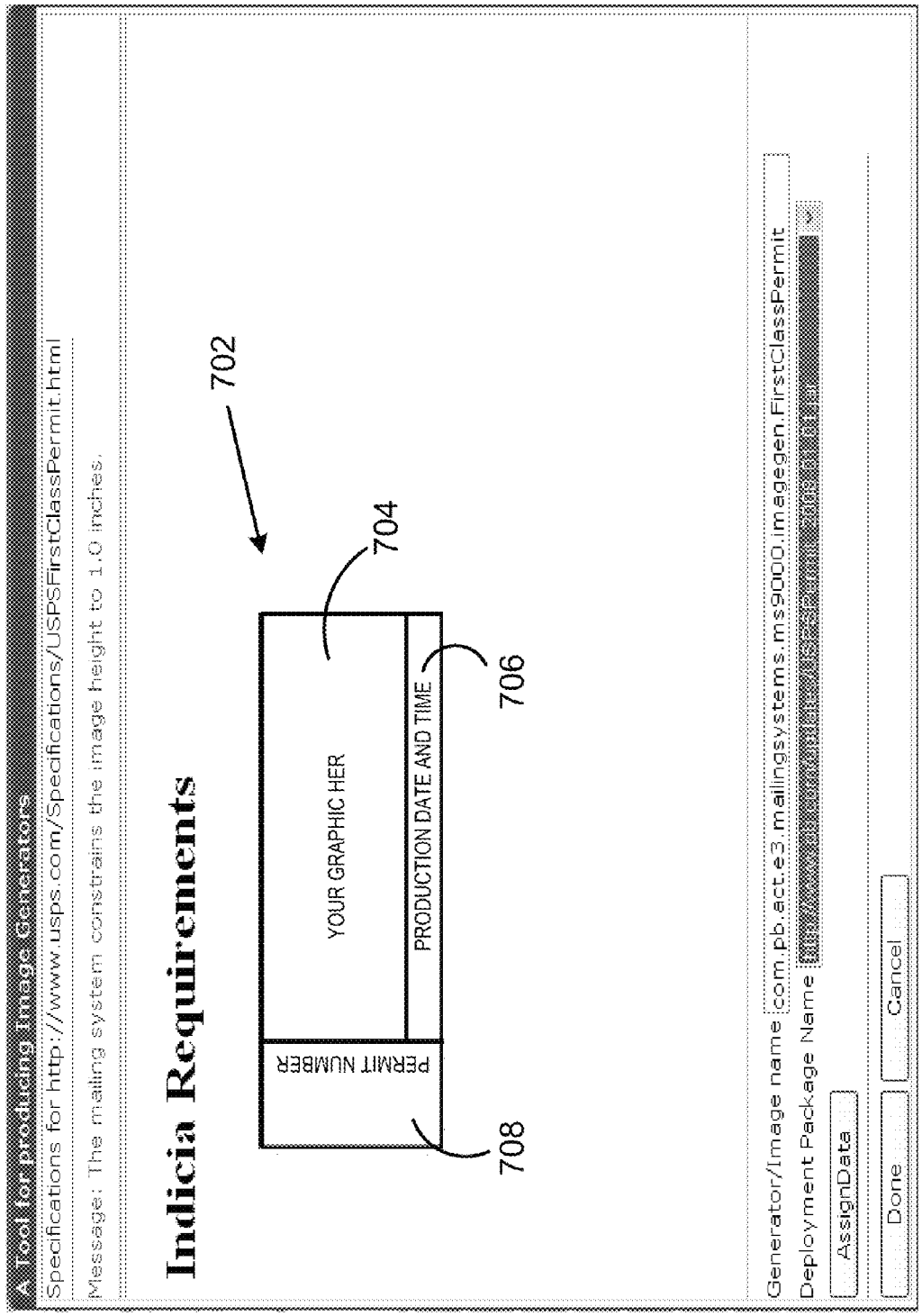
FIGS. 7 and 8 are example screen displays that may be provided by the computer of FIG. 3 in connection with the process of FIG. 4.
Figure 8:
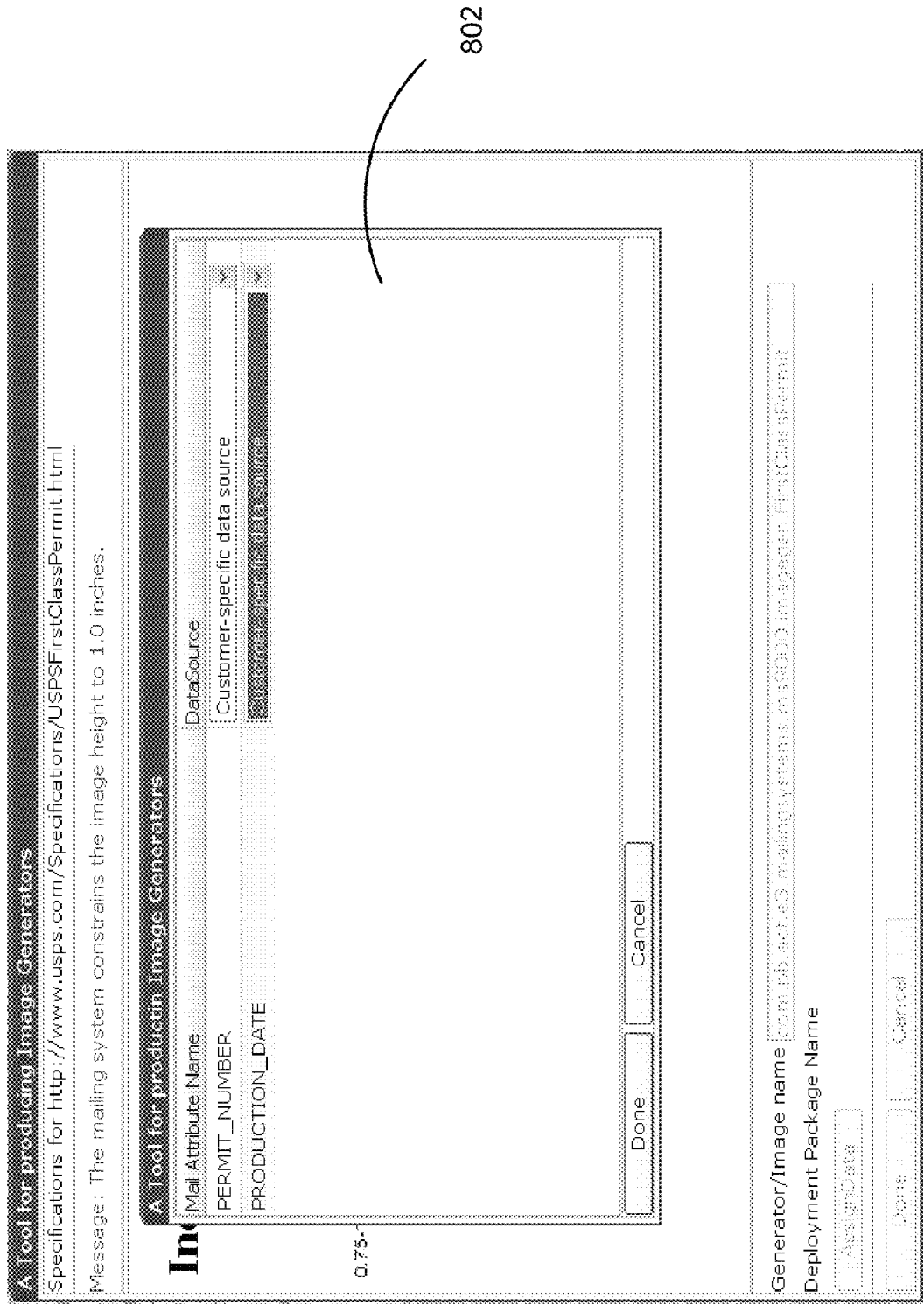

At decision block 606, the provisioning document generation computer 301 determines from information extracted from the MSC document whether the target mailing equipment has the capability for printing the required information on the mail piece. If such is the case, then block 608 follows decision block 606. At block 608, the provisioning document generation computer 301 interacts with a user of the provisioning document generation computer 301 to define one or more images and/or one or more sources for the information to be printed on the mail piece. The interaction may, for example, be facilitated by a graphical user interface in a manner illustrated in FIGS. 7 and 8. For example, the provisioning document generation computer 301 may present the screen display shown in FIG. 7, which includes a representation 702 of a postage indicia defined as a mail piece informational requirement by the CPDF document. In some cases, the representation 702 may also reflect limits in the capabilities of the mailing equipment, as indicated by the MSC document. (For example, the CPDF may allow the indicia to be up to 1.25 inches high, whereas the capabilities of the target mailing equipment only allow printing of an indicia of up to 1.0 inch in height.) The screen display of FIG. 7 may allow the user of the provisioning document generation computer 301 to link an externally defined image to fill a graphic field (reference numeral 704) in the indicia 702. Further, the screen display of FIG. 7 may allow the user of the provisioning document generation computer 301 to link a respective data source to each other field (reference numerals 706, 708) in the indicia 702. For example, by actuating the "Assign Data" button shown at 710 in FIG. 7, the user may cause the provisioning document generation computer 301 to provide the screen display shown in FIG. 8. In the latter display, a pop up window 802 allows the user to select data sources to be linked to the fields 706, 708 (FIG. 7, not visible in FIG. 8).

Referring again to FIG. 6, once the user has linked externally designed images and/or data sources to an image format, the process advances from 608 to 610. At 610, the provisioning document generation computer 301 writes into the relevant section of the provisioning documents the requirements for accessing an externally supplied image and/or external data sources. The process then advances from block 610 to decision block 612. At 612, the provisioning document generation computer 301 determines whether there is at least one more informational requirement in the CPDF which has not yet been satisfied in the provisioning document. If there are more informational requirements, then the process of FIG. 6 loops back to block 602. Otherwise the execution of block 510 is complete, as indicated at 614.

Considering again decision block 606, if it is determined at that decision block that the target mailing system does not have the capability of printing the required information on the mail piece, then the process of FIG. 6 advances from decision block 606 to block 616. At block 616, the provisioning document generation computer 301 inserts into the provisioning document an indication that it is required to have the information printed on the mail piece by a device that is external to the mailing equipment. Then, from 616, the process advances to decision block 612.

Considering again decision block 604, if it is determined at that decision block that the currently considered informational requirement does not require printing on the mail piece, then the process advances from decision block 604 directly to decision block 612.

Referring again to FIG. 5, the process illustrated therein also includes blocks 512-516, which may be performed after block 510. In blocks 512-516, the provisioning document generation computer 301 generates the various scripts which comprise portions of the provisioning documents. These scripts were mentioned in the above discussion of the provisioning document 212, and may include scripts for configuring input or output devices (i.e. devices for physically handling items to be processed in the mailing equipment), a mailing job set up script, and a mailing job execution script. Examples of such scripts are contained in the Appendix, as discussed above. In some embodiments and/or in some situations, the scripts are entirely generated by automatic operation of the provisioning document generation computer 301. In other embodiment or situations, the scripts at least partially reflect input provided by an operator of the provisioning document generation computer 301.

The process of FIG. 5 also includes a block 518, at which the provisioning document generation computer 301 creates other portions of the provisioning document, including for example sections of the provisioning document that relate to rating (e.g., postage charges applicable to the mail pieces). Rating may involve determining the rate/price to apply to each mail piece for charges payable to the carrier. The rates information may be embedded in the provisioning document or accessible via an external service. In the former case, the provisioning document may instruct the mailing equipment to modify internal rate tables and/or processes for rate calculation. In the latter case, the provisioning document may provide information to the mailing equipment on how to connect to the rating service and what protocol to use in requesting rate information. Still other sections of the provisioning document may relate to mail piece accounting, including reporting accounting information to the mailer. Other sections may relate to data reporting and collection (what, how and where to access data associated with the carrier product offering), data reporting and/or publishing (instructions on publishing information during usage of the product offering), and payment and security (payment of carrier's charges and related security features). Still another section may relate to rules relating to usage of the product offering. These rules may, for example, relate to eligibility for using the product offering rather than rules governing production of compliant mail pieces. The provisioning document may further include information relating to rules established by the mailer relating to its use of the product offering. Such rules may, for example, relate to weight breaks to be applied in choosing carriers, account balances or rules relating to a particular service. Also, the provisioning document may reflect rules established by the equipment manufacturer.

In some embodiments, the provisioning document as provided to the target piece of mailing equipment may be generated in stages. For example, initially a provisioning document that is intended for a class of mailing equipment (e.g., for a family of related models of mailing equipment) may be generated, subject to being completed in later stages. In the next stage, using the class provisioning document, a type provisioning document may be generated that is intended for a certain type of mailing equipment (e.g., for pieces of mailing equipment that belong to a particular model). The type provisioning document may then be completed in a final stage to produce a provisioning document suitable for use in a particular installation (e.g., by a certain mailer/mailing entity).

Figure 9:
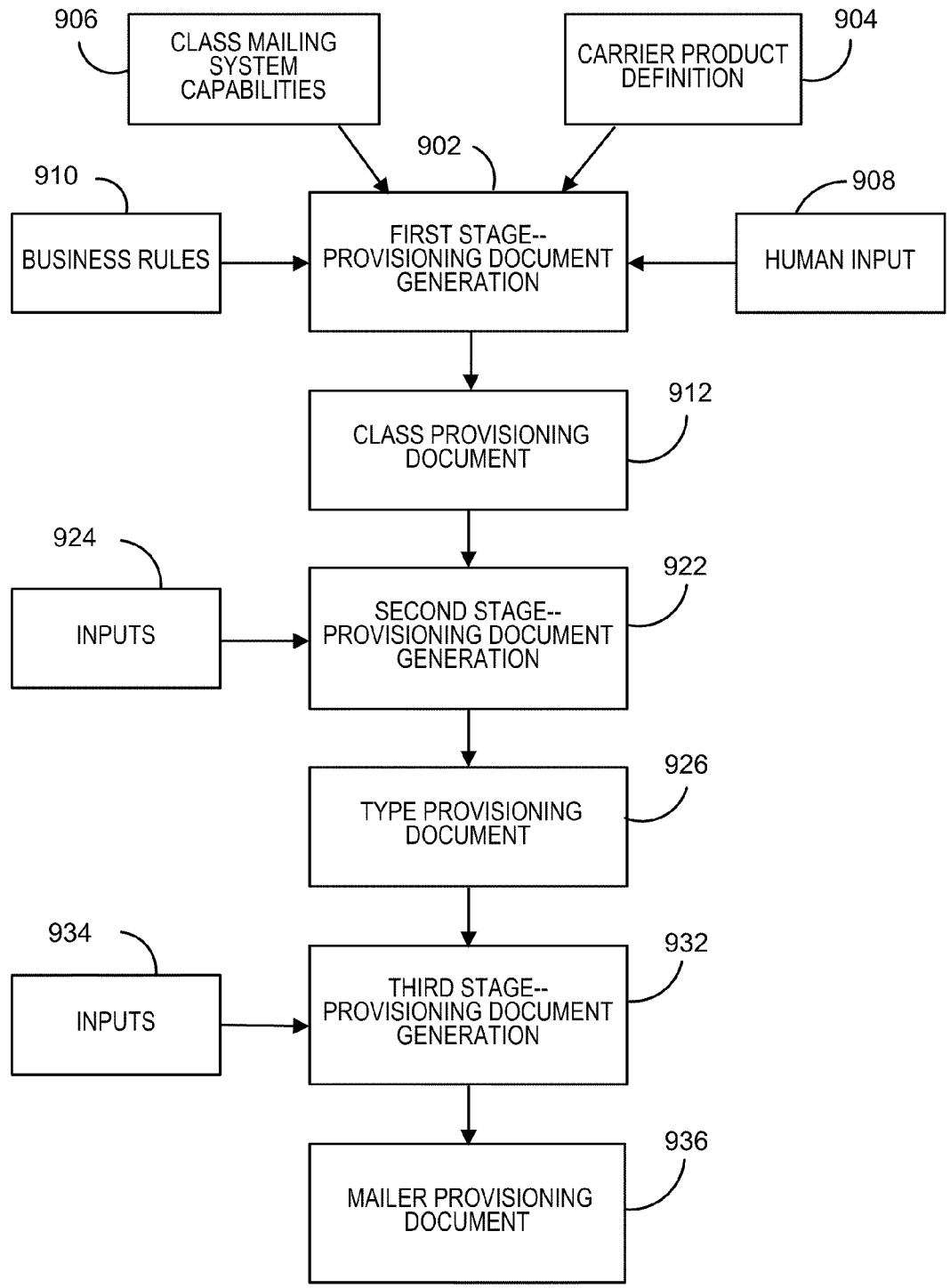
FIG. 9 schematically illustrates another process that may be performed in accordance with aspects of the present invention.

FIG. 9 schematically illustrates a process for generating a provisioning document in stages in accordance with aspects of the present invention. Block 902 represents a first-stage provisioning document generation function or device. The inputs to (and received by) the function/device 902 may be similar to those described above in connection with FIG. 2, including a CPDF 904, human input 908 and a business rules document 910. Another input may be an MSC 906 that describes common attributes of a class of mailing equipment. By a similar process to that described above with respect to FIGS. 4-6, the first-stage provisioning document generation function/device 902 may generate the above-mentioned class provisioning document, represented by block 912.

The class provisioning document 912 is an input to (and is received by) a second-stage provisioning document generation function/device 922. The second-stage provisioning document generation function/device 922 may receive other inputs (block 924) which may be similar to the inputs for the first-stage provisioning document generation function/device 902. However, the other inputs 924 for the second-stage provisioning document generation function/device 922 may include a supplemental MSC that describes attributes of a particular model (type) of mailing equipment within the class of mailing equipment described by the MSC document 906. (In some cases, for example, the second-stage process may occur upon introduction of a new model of mailing equipment within an existing class or family of mailing equipment.) Based on the class provisioning document 912 and the other inputs 924, the second-stage provisioning document generation function/device 922 further populates and/or revises the class provisioning document 912 to generate the type provisioning document (represented by block 926).

The type provisioning document 926 is an input to (and is received by) a third-stage provisioning document generation function/device 932. The third-stage provisioning document generation function/device 932 may receive other inputs (block 934) such as a business rules document and/or human input, both of which may be pertinent to desired requirements for operation of the target mailing equipment at a particular installation or mailer. (In some cases, for example, the third-stage process may occur prior to delivering the target mailing machine to a particular mailer/customer.) Based on the type provisioning document 926 and the other inputs 934, the third-stage provisioning document generation function/device 932 further populates and/or revises the type provisioning document 926 to generate a mailer/site specific provisioning document 936 (referred to as a "mailer provisioning document"). The mailer provisioning document 936 may be similar to the document attached hereto as Appendix B, and may be supplied to and read by the target piece of mailing equipment (not shown in FIG. 9) to configure the target piece of mailing equipment to produce mail pieces/mailings in accordance with the service offering described by the CPDF 904.

A multi-stage process for generating a provisioning document may include, in some embodiments, more than three stages.

In some embodiments, each of the first, second and third stages of the provisioning document generation process illustrated in FIG. 9 may be performed by a different respective general purpose computer which is programmed for that purpose. Each computer may be conventional in its hardware aspects and may have the same hardware components and architecture as described above in connection with FIG. 3.

In other embodiments, two or more of the stages may be performed in the same computer.

Up to this point, this disclosure has been primarily concerned with generation of a provisioning document for controlling operation of a piece of mailing equipment, thereby configuring the piece of mailing equipment to operate in compliance with the requirements of a service offering provided by a mail carrying agency. In this regard, there has been described a provisioning document generation software tool which programs a computer to generate the provisioning document based on certain inputs. In at least some embodiments, it may also be desirable to program the mailing equipment with a provisioning document application software tool which enables the mailing equipment to read, interpret and operate in accordance with provisioning documents supplied to the mailing equipment. For example, the provisioning document application software tool may include a driver component and an adapter component. The driver component may interpret the provisioning document so as to extract therefrom data and/or scripts contained in the provisioning document. The adapter component may contain programming required to adapt the data and/or scripts for application in the particular mailing machine in question. The provisioning document application software tool may also include a user-level API (application programming interface) and connection API. The user-level API may expose the mailer to the provisioning document creation system and may include methods for initializing the mailing equipment, querying whether the mailing equipment can support a given product offering, querying the current state of the mailing equipment to determine which products the mailing equipment is prepared for and which of the capabilities have been enabled for the given product, using the provisioning document to prepare the mailing equipment, removing the product from the mailing equipment, asking what manual tasks need to be done prior to running a job (e.g., changing ink) and creating and launching mailing jobs. The connection API may connect to the actual hardware and/or control for the mailing equipment, including a provision method to pass the provisioning document as an argument, a job set up method and an job execution method.

Activities described herein as being performed by a letter or parcel carrier may instead be performed by another entity acting on behalf of the letter or parcel carrier. The term "letter or parcel carrier" as used herein and in the appended claims should be understood to include another entity acting on behalf of a letter or parcel carrier.

Although the above description and accompanying drawings suggest an order in which process steps may be performed, the suggested order of steps is not required and rather may be varied in any manner that is practicable.

As used herein and in the appended claims, the term "provisioning" refers to enabling a piece of mailing equipment to process a mail piece in compliance with a requirement set forth in a carrier product description file.

As used herein and in the appended claims, the term "letter or parcel carrier" is synonymous with "mail carrying agency" as defined above.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

APPENDIX

```
<?xml version="1.0" encoding="UTF-8"?>
<ns3:E3MailingSystemProvision documentId="Legal Correspondence:
MegaTron3211, Wed Nov 12 14;44:53 EST 2008"
xmtna="http://www.pb.com/temp/baseTypes"
        xmlns:ns2 "http://www.upu.org/EPPML"
        xmlns:ns3="http://www.pb.com/act/fmtle3/provisioning"
        xmlns:xsl="http://www.w3.org/2001/XMLScheme-Instance"
        xsi:schemaLocation-"http://www.pb.com|act/fmtle3/provisioning
        ../schemadocs/e3Provisioning.xsd"> <ns3:ProductName>
                <ns3:PreferredName>Legal
Correspondence<|ns3:PreferredName> <ns3:CarrierDefined>First
Class Mail - Permit Letter</ns3:CarrierDefined>
</ns3:ProductName>
        <ns3:TermsAndAgreements>
                <ns3:TermsAndAgreementsDoc
                requiresAcknowledgement="true">
                <ns3:Reference>http://www.foo.com</ns3:Reference>
                <|ns3.TermsAndAgreementsDoc>
</ns3:Term&AndAgreemments> <ns3:ExpirstionDate>2009-12-
31700:00:00</ns3:ExpirationDate> <ns3:InputSet>
        <ns3:CPDFDocumentId>FirstClassPermitLetter</ns3:CPDFDocu
mentId> <ns3:MSCDocumentId>| 1110000</ns3:MSCDocumentId>
</ns3:InputSet>
<ns3:TargetSystemId>MegaTron3211</ns3:TargetSystemId>
<ns3:Requirement Type="EXTERNAL">
<ns3:OtherCPOFRequirement>InformationalRequirement:0.1
</ns3:OtherCPDFRequirement> </ns3:Requirement>
<ns|Requirement Type--"SOFTWARE">
        <ns3:Name>Update</ns3:Name>
        <ns3:Value>http://www.pb.com/updatesAJSPSPermit 2008-01-
        01.jar</n$3:Value> <ns3:Version>1.1 </ns3:Version>
</ns3:Requirement> <ns3:MailFinishing> <ns3:Provision>
<ns3:e3script> import com.pb.act.fmt.e3.SystemConfig; void run( )
                        SystemCongif.setFeeder(true);
                        SystemCongif.setMinLength(5.0);
        SystemCongif.setMaxLength(11.5);
        SystemCongif.se(MinHeight(M);
        SystemCongif.setMaxHeight(t3.125);
        SystemCongif.setMinWidth(0.0070);
        SystemCongif.setMaxWidth(0.25);
        SystemCongif.setMaxWeight(3.5);
        SystemCongif.loadImageGenerator(com.pb.imagegenerators.FirstCl
        assPermit): </ns3:e3script>
</ns3:Provision> <ns3:ImageGeneration> <ns3:SetupPhase>
<ns3|e3script xmlns:xs="http://wwN.w3.org/2001/XML$chema"
xs|:type="xs:string"> import com.pb.act.detaspace.E3Dataspace;
                        import com.pb.acUmt.e3.SystemConfig; public void run( ) (
                                E3Dataspace imageGenDataSet =
                                createDataspace("imageGenParameters");
                                imageGenDataSet.put("PERMIT_NUMBER",UserProxy.get
                                PERMIT NUMBER( )):
                                imageGenDataSet.export("http_//localhst/detasets/firstCless
                                Perfnit/imagaGen.ds");
                        private E3Dataspace createDataspace(String name) {
                        Properties props = new Properties( );
                                props. put("name", name); try {
                                return new
```

APPENDIX-continued

```
E3DataspaceFactory( ).create("com,pb.act.dataspace.SimpleInMemory
Dataspace", props); ) catch (E3DataspaceException e)
                                            e.printStackTrace( );
                        } <ns3:e3script> </ns3:SetupPhase> <ns3:ExecutionPhase>
                <ns|e3script
                        xmlns:xs="http:tt ww.w3.org/20011XMLSchema"
                        xsi;type="=string"> import java.awt.image.Bufferedrmage;
                        Import com.pb.act.dataspace.E3Dataspace; E3Dataspace
                        dataCaptureDataSet = null; E3Dataspace imageGenDataSet
                        = null; E31mageGenerator imageGenerator = null;
                        com,pb.imagegenerators.FirstClassPermit imageGenerator=
                        null; void init( )(
                                imageGenerator =
                                        createImageGenerator("com.pb.imagegenerators.FirstClas
                                        sPermit"); dataCaptureDataSet =
                                        createDataspace("dataCaptureDataspace");
                                        imageGenDataSet =
                        createDataspace("imageGenParameters");
                        imageGenDataSet.import("http://localhst/datasets/firstClassPe
                        rmit/imageGen.ds");}
                                public void run( )(
                                        while (|Runtime.getJobDone( ))
                                                ImageGenDataSet.put("PRODUCTION DATE",
                                                Runtime.getPRODUCTION DATEQ); SufferedImage
                                                indiciaImage =
                                                IndiciaGenerator.create(imageGenDstaSet);
                                                print(indiciaImage,$(ImagePlacement));
                                                }
                }
                        void finish( )}
dataCaptureDataSet.export("http://localhost|datasetsffirstClassPermit(d
                                ataCapture.1228519093734.ds"); private E3Dataspace
                                createDataspace(String name ){
                                        Properties props = new PropertiesQ; props.put("name",
                                        name);
                                        try {
                                                return new
E3DataspaceFactory( ).create("com,pb.act.dataspace.SimpleInMemory
Dataspace", props); } catch (E3DataspaceException e) {
                                                e.printStackTrace( );
                                                }
                        }
                                                </ns3:e3script>
                        </ns3:ExecutionPhase>
                        </ns3:ImageGeneration>
                <ns3:ImagePlacement>
                        <ns3:FromTop unitsm"INCH">
                <Value>0.25<Value>
                </ns3:FromTop>
                        <ns3:FromRight units="INCH">
                        <Value>0.25<Value>
                        </ns3:FromRight>
                </ns3:ImagePlacement>
                </ns3:MailFinishing>
        <ns3:Rating>
                <ns3:FixedPrice>0.37</ns3;FixedPrice>
                </ns3'Rating>
</ns3:E3MailingSystemProvision>
```

What is claimed is:

1. A method comprising:

receiving, by a first computer, a first input document, the first input document being a carrier product description file generated by a letter or parcel carrier;

receiving, by the first computer, a second input document, the second input document describing attributes of a class of mailing equipment;

extracting, by the first computer, information from the first input document and extracting information from the second input document; and generating, by the first computer, a class provisioning document based at least in part on the information extracted from the first input document and the second input document;

receiving, by a second computer, the first input document, the second input document, the class provisioning document and a third input document, the third input document describing attributes of a type of mailing equipment that is a subset of said class of mailing equipment;

extracting, by the second computer, information from the first input document, the second input document and the third input document;

generating, by the second computer, a type provisioning document based at least in part on the third input document and the class provisioning document;

receiving, by a third computer, the first input document, the second input document, the type provisioning document and the third input document;

further receiving, by the third computer, fourth input, the fourth input relating to requirements for operating by a single mailer one or more pieces of mailing equipment of said type of mailing equipment; and generating, by the third computer, a mailer provisioning document based at least in part on said fourth input and said type provisioning document;

wherein:

the mailer provisioning document is suitable for preparing at least one piece of mailing equipment which belongs to said type of mailing equipment to be controlled, such that said at least one piece of mailing equipment generates mailpieces in compliance with said carrier product description file;

the mailer provisioning document includes a script for controlling operation of said at least one piece of mailing equipment and data to be read by said at least one piece of mailing equipment;

the first computer, the second computer, and the third computer are all different computers from each other;

the first input document, the second input document, the class provisioning document, the third input document, the type provisioning document, the fourth input, and the mailer provisioning document are all separate, different sets of data from each other; and the type of mailing equipment is a smaller set than the class of mailing equipment.

2. The method according to claim 1, wherein the first input document is expressed in accordance with Extensible Postal Product Model and Language (EPPML).

3. The method according to claim 1, wherein at least one of the class provisioning document, the type provisioning document and the mailer provisioning document is generated based in part on input received from a human operator.

4. The method according to claim 1, wherein the mailer provisioning document defines behavior for the at least one piece of mailing equipment in connection with the at least one piece of mailing equipment printing information on mail pieces.

5. The method according to claim 1, wherein the mailer provisioning document defines behavior for the at least one piece of mailing equipment in connection with the at least one piece of mailing equipment printing a document to accompany a group of mail pieces generated by the at least one piece of mailing equipment.

* * * * *